US007984471B2

(12) United States Patent
Lesenne et al.

(10) Patent No.: US 7,984,471 B2
(45) Date of Patent: Jul. 19, 2011

(54) METHOD AND DEVICE FOR THE TRANSMISSION OF DATA IN A TELEVISION SYSTEM

(75) Inventors: Laurent Lesenne, Acigne (FR); Frédéric Pasquier, Laillé (FR)

(73) Assignee: Thomson Licensing, Boulogne-Billancourt (FR)

( * ) Notice: Subject to any disclaimer, the term of this patent is extended or adjusted under 35 U.S.C. 154(b) by 1025 days.

(21) Appl. No.: 10/399,987

(22) PCT Filed: Oct. 18, 2001

(86) PCT No.: PCT/EP01/12333
§ 371 (c)(1),
(2), (4) Date: Nov. 4, 2003

(87) PCT Pub. No.: WO02/35791
PCT Pub. Date: May 2, 2002

(65) Prior Publication Data
US 2004/0078826 A1    Apr. 22, 2004

(30) Foreign Application Priority Data
Oct. 23, 2000   (EP) ..................................... 00402921

(51) Int. Cl.
*H04N 7/173*      (2006.01)
(52) U.S. Cl. ......... 725/112; 725/109; 725/135; 725/136
(58) Field of Classification Search .................. 725/109, 725/112, 135, 146
See application file for complete search history.

(56) References Cited

U.S. PATENT DOCUMENTS

| 5,694,163 | A |   | 12/1997 | Harrison |
|---|---|---|---|---|
| 6,009,274 | A | * | 12/1999 | Fletcher et al. ................ 717/173 |
| 6,040,829 | A | * | 3/2000 | Croy et al. ..................... 715/864 |
| 6,055,364 | A | * | 4/2000 | Speakman et al. ............ 709/229 |
| 6,278,995 | B1 | * | 8/2001 | Hawkinson ....................... 707/4 |
| 6,311,165 | B1 | * | 10/2001 | Coutts et al. .................... 705/21 |
| 6,460,180 | B1 | * | 10/2002 | Park et al. ........................ 725/40 |
| 6,557,111 | B1 | * | 4/2003 | Theimer et al. ................... 714/4 |

(Continued)

FOREIGN PATENT DOCUMENTS

JP    2000-156658 A    6/2000

(Continued)

OTHER PUBLICATIONS

Wieland Holfelder, Interactive remote recording and playback of multicast videoconferences, Computer Communications, Oct. 1, 1998, pp. 1285-1294, vol. 21, Elsevier Science B.V., Amsterdam, NL.

(Continued)

*Primary Examiner* — Andrew Y Koenig
*Assistant Examiner* — Junior O Mendoza
(74) *Attorney, Agent, or Firm* — Robert D. Shedd; Vincent E. Duffy; Joel M. Fogelson (57) ABSTRACT

The invention concerns a method for transmitting binary data in a video transmission system. The method comprises the steps of providing ATVEF announcements on a first predefined IP multicast address; providing ATVEF trigger and/or content transmission on a first range of IP multicast addresses; providing non-ATVEF announcements on a second predefined multicast address different from said first address; and providing non-ATVEF data transmission on a second range of IP multicast addresses, exclusive of the first range. The invention also concerns an emitter and a receiver for implementing the method.

12 Claims, 5 Drawing Sheets

U.S. PATENT DOCUMENTS

| | | | | |
|---|---|---|---|---|
| 6,567,851 B1* | 5/2003 | Kobayashi | | 709/228 |
| 6,718,387 B1* | 4/2004 | Gupta et al. | | 709/226 |
| 6,829,232 B1* | 12/2004 | Takeda et al. | | 370/352 |
| 7,024,476 B1* | 4/2006 | Page et al. | | 709/224 |
| 7,174,562 B1* | 2/2007 | Leak et al. | | 725/110 |
| 7,237,253 B1* | 6/2007 | Blackketter et al. | | 725/61 |
| 7,263,711 B1* | 8/2007 | Estipona | | 725/112 |
| 7,284,261 B1* | 10/2007 | Connelly | | 725/140 |
| 7,370,114 B1* | 5/2008 | Philyaw et al. | | 709/231 |
| 7,487,529 B1* | 2/2009 | Orlick | | 725/42 |
| 7,720,903 B1* | 5/2010 | Huckins | | 709/200 |
| 2001/0003212 A1* | 6/2001 | Marler et al. | | 725/40 |
| 2002/0056129 A1* | 5/2002 | Blackketter et al. | | 725/112 |
| 2003/0133043 A1* | 7/2003 | Carr | | 348/563 |
| 2003/0165140 A1* | 9/2003 | Tang et al. | | 370/393 |
| 2003/0204854 A1* | 10/2003 | Blackketter et al. | | 725/113 |

FOREIGN PATENT DOCUMENTS

| | | |
|---|---|---|
| WO | WO 99/55088 A1 | 10/1999 |
| WO | 00/35191 A1 | 6/2000 |

OTHER PUBLICATIONS

M. Handley et al., "SDP: Session Description Protocol", Network Working Group, Request for Comments: 2327, Category: Standards Track, Apr. 1, 1998.

Anonymous, "Advanced Television Enhancement Forum Specification (ATVEF)", International Telecommunication Union, Radiocommunication Study Groups, Document 10-11/12-E, Version 1.1 revision 26, Feb. 2, 1999.

* cited by examiner

ATVEF Stack

Fig. 1a (Prior art)

Non ATVEF Stack

METHOD AND DEVICE FOR THE TRANSMISSION OF DATA IN A TELEVISION SYSTEM

This application claims the benefit under 35 U.S.C. §365 of International Application PCT/EP01/12333 filed Oct. 18, 2001, which claims the benefit of European patent application No. 00402921.1 filed Oct. 23, 2000.

FIELD OF THE INVENTION

The invention concerns a method for transmitting data in a television system, as well as an emitter and a receiver in such a system. The invention applies in particular, but is not limited to, systems implementing the ATVEF specification.

BACKGROUND INFORMATION

Television receivers are being developed to host resident interactive services, transmitted for example through a bi-directional return channel or simply broadcast over the same channel as the video signal. In this context, ATVEF (Advanced TeleVision Enhancement Forum) specifies the use of a number of protocols such as IP multicast (Internet Protocol multicast) for transporting data for interactive television program enhancement services over a number of transmission media.

According to the ATVEF specification, when a service provider wishes to transmit an interactive service, he first has to transmit a message called an announcement, containing information describing the interactive service. This announcement is transmitted to a specific IP multicast address and to a specific port, known to all receivers (IP address 224.0.1.113 and UDP Port 2670).

Receivers compatible with the ATVEF specification continuously monitor this address/port couple. Their resident software modules retrieve the announcement, which contains a pair of IP addresses, one for the transmission of the interactive service (called the 'content'), another one of the transmission of triggers. Triggers are messages for triggering a certain behavior of interactive services at predetermined moments.

Software modules resident in the receivers may require updates. For flexibility reasons, it should be possible to make such an update in remote fashion, i.e. to transmit the updated software modules to the receivers in situ. Such a transmission should obviously use some of the already available transmission media, such as the return channel (be it through the PSTN or the cable network, or another type of bi-directional communication means) or the television broadcast medium.

Figure 1A:
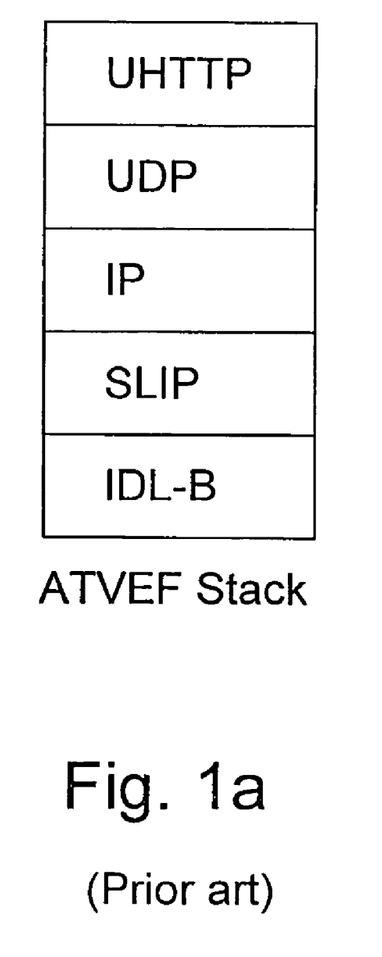
FIG. 1a (prior art) represents an ATVEF protocol stack.

The ATVEF protocol stack (see FIG. 1a) cannot be used directly to transmit the update—or other types of binary data—, because the software in charge of retrieving the interactive service (e.g. a browser) is not able to interpret the content data which represents the resident software module update. This update is typically binary data, instead of the UHTTP data expected by the browser. This could result in unpredictable behavior at the receiver level. Modifying the browser to detect and process binary data would be impractical. In addition, transporting binary data using UHTTP is cumbersome, since this protocol has not been developed for such a purpose.

Nevertheless, it is desired to respect as much a possible the ATVEF protocol, to remain within the constraints defined by the broadcast tools.

SUMMARY OF THE INVENTION

The object of the invention is a method for transmitting binary data in a video transmission system comprising the steps of:
  providing ATVEF announcements on a first predefined IP multicast address;
  providing ATVEF trigger and/or content transmission on a first range of IP multicast addresses;
  providing non-ATVEF announcements on a second predefined multicast address different from said first address;
  providing non-ATVEF data transmission on a second range of IP multicast addresses, exclusive of the first range.

According to an embodiment of the invention, said system comprises an emitter comprising a data inserter for inserting ATVEF and non-ATVEF information into a transmission signal, said method further comprising the steps of:
  providing ATVEF announcements and non-ATVEF announcements to the data inserter,
  dynamic insertion of IP multicast addresses by the data inserter into the announcements, in accordance with the first and second ranges.

According to an embodiment of the invention, the method further comprises the step of splitting each of the first and/or the second range of IP multicast addresses into a third and a fourth range, where the third range is reserved for automatic address determination by the data inserter, and the fourth range is reserved for addresses which are predefined in the announcements provided to the data inserter.

According to an embodiment of the invention, ranges are distinguished by different IP address ranges, different port ranges or both.

According to an embodiment of the invention, at the level of a receiver, the method further comprises the steps of:
  receiving a non-ATVEF announcement announcing transmission of receiver software update data, said announcement containing an IP multicast address on which signaling data describing the update data transmission is to be sent;
  listening to the address specified in the announcement;
  retrieving the signaling data and storing it in a memory which is not erased during download of the update data;
  launching of a loader program;
  having the loader program retrieve the stored signaling data; and
  proceeding with the download of the update data based on the stored signaling data.

Another object of the invention is an emitter device for broadcasting announcements in a transmission system compatible with ATVEF transmissions, characterized in that it comprises means for transmitting ATVEF announcements on a first predefined IP multicast address, ATVEF trigger and/or content data on a first range of IP multicast addresses, binary data announcements on a second predefined IP multicast address different from the first predefined address and binary data on a second range of IP multicast addresses, wherein the first and second address ranges are exclusive of each other.

According to an embodiment of the invention, the emitter comprises means for receiving an announcement, for determining whether the announcement comprises a predetermined IP multicast address in a first range, and in the negative, for selecting an IP multicast address in a second range, distinct from the first range, and for inserting the selected IP multicast address into the announcement.

Another object of the invention is a receiver in an ATVEF compatible transmission system, characterized in that it comprises a memory for storing a first predefined IP multicast address for receiving ATVEF announcements, and a second predefined IP multicast address for receiving announcements relating to the transmission of binary data, where the first and second addresses are distinct.

According to a variant embodiment, the receiver further comprises a memory for receiving a third multicast address on which binary data transmission is announced, said memory being such as to maintain the multicast address during a receiver reboot process, said receiver further comprising means for listening to the third multicast address in the memory after reboot for downloading the binary data from said third multicast address.

According to an embodiment, the third multicast address on which binary data transmission is announced is provided in signaling data announced on said second multicast address.

According to an embodiment, the downloaded binary file is a complete system update.

Other characteristics and advantages of the invention will appear through the description of a detailed, non-limiting embodiment, explained with the help of the attached drawings, among which:

DETAILED DESCRIPTION OF THE INVENTION

In the figures, the symbol '@' is used to designate an address.

More information concerning the ATVEF specification can be found in the document "Enhanced Content Specification" ATVEF (Advanced TeleVision Enhancement Forum) Specification v 1.1 r26. This document is available for example on the ATVEF website.

Reference is also made to the document 'SDP: Session Description Protocol', Internet Society, Network Working Group, RFC 2327 of Apr. 1998.

Announcements according to the ATVEF specification follow the format described in the SDP document mentioned in the previous paragraph, though ATVEF imposes some restrictions for some parameters. Parameters used in an SDP announcement according to the ATVEF specification are as follows:

Session Description
v=protocol version, equal to 0
o=username, session identifier, version, network type (equal to IN in the present case), address type (equal to IP4 in the present case), ipaddress
s=session name
i=session information (optional)
u=Universal Resource Identifier (URI) of a description of the enhancement (optional)
e=email address
p=phone number (at least one of the e and p parameters is required)
b=CT:number (bandwidth information)
c=connection information
The following session attributes can or must be used:
a=UUID:UUID (Universally Unique Identifier: unique enhancement identifier-optional)
a=type:tve
a=lang, a=sdplang (optional language attributes)
a=tve-type:<types> (optional)
a=tve-size: Kbytes
a=tve-level:x (optional)
a=tve-ends:seconds (optional)
Media Description
m=(media name and transport address)
Time Description
t=(time during which the session is active)

As has already been mentioned in the introduction, ATVEF announcements are sent to a predefined IP address (224.0.1.113) and a predefined UDP port number (2670).

The parameter 'c' of an announcement indicates to which address content and triggers will be sent, while the parameter 'm' indicates on which port they will be sent. Triggers and content may be sent on different ports at the same address, as well as on different addresses.

The present embodiment concerns an analog television system in which the vertical blanking interval lines of the analog video signal are used to transmit digital data. Modulation of this kind of data on an analog television signal is well known per se.

Figure 1B:
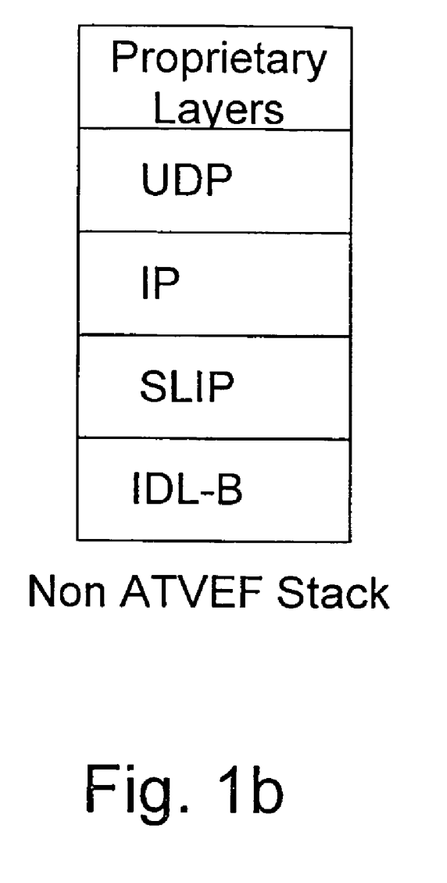
FIG. 1b represents a protocol stack of a device according to the embodiment.

FIG. 1b is a diagram of the protocol stack used by a receiver in conformance with the present embodiment. Compared to the ATVEF stack of FIG. 1a, the UHTTP layer has been replaced by a proprietary layer. The stack includes UDP (User Datagram Protocol) over IP (Internet Protocol), SLIP (Serial Line Internet Protocol) and IDL-B, as defined in ETS 300 708.

The role of the proprietary layer is to manage binary data downloading. The binary data to be downloaded is split into sections having the size of IP packet payloads, i.e. 1472 octets. The layer assembles the different sections it receives in the right order. If a section contains uncorrectable errors, then the proprietary layer waits for a next transmission (see below) and inserts it at its proper place.

The proprietary layer also retrieves date/time information and announcements relating to binary data downloads and date/time information.

Enhancements and binary data are usually sent repeatedly, in order to enable receivers to access the corresponding data even when they do not listen from the beginning of the transmission, and in order to retrieve packets which were previously received with uncorrectable errors.

According to the present embodiment, in order to announce the transmission of binary data, an announcement of the SDP format is made at another address and port than the address and port used by the ATVEF announcements. Accordingly, as an example, the receiver listens to the address 235.0.1.113, port number 2670, to detect these novel types of announcements. In parallel, the receiver continues to listen to the standard ATVEF announcement address and port.

Figure 2:
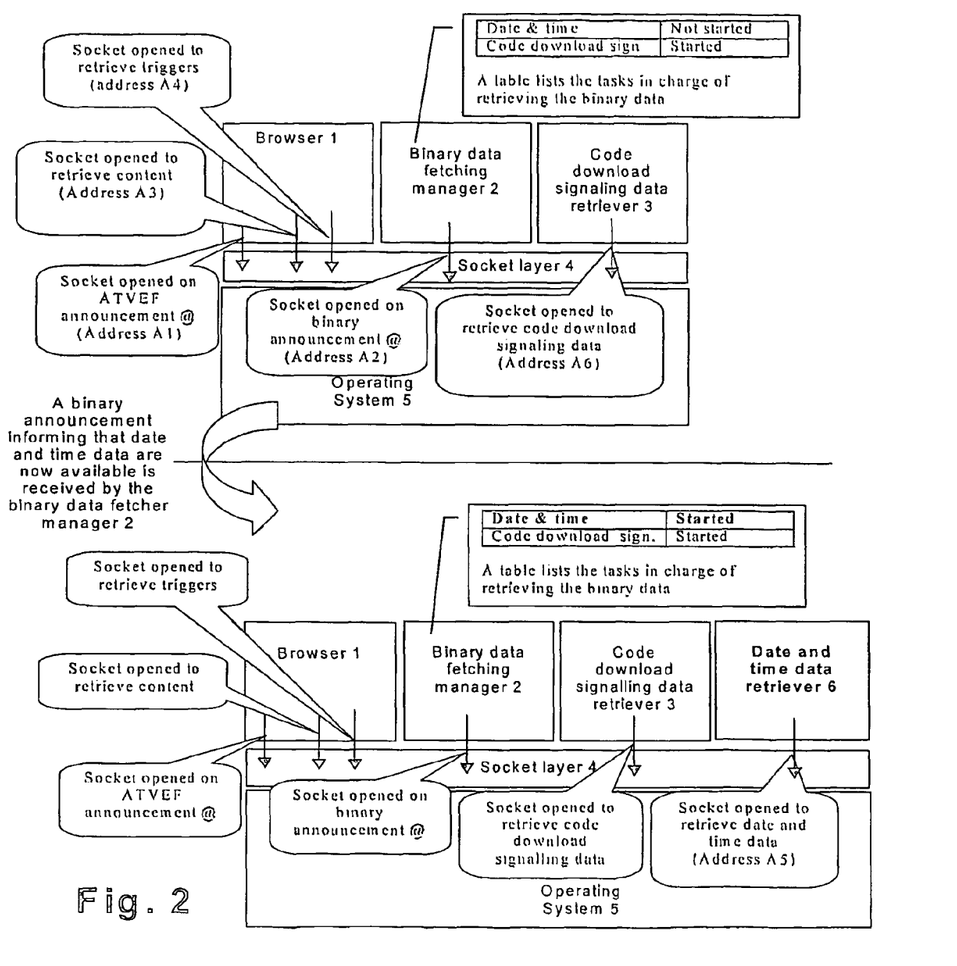
FIG. 2 represents the software structure of a receiver, as well as different applications and tasks and their evolution upon reception of an announcement.

FIG. 2 is a diagram of an example of the applications and tasks that a receiver according to the present embodiment runs in parallel according to the present embodiment. Of course, other applications and tasks may also run, but are not directly relevant to the present embodiment. The receiver listens to six different IP multicast addresses, numbered A1 to A6. An IP multicast address comprises an IP address and a port number. An ATVEF announcement is sent to the well-known ATVEF address/port couple A1 as already described above. ATVEF content and triggers ('ATVEF data') is sent to two different address/port couples, A3 and A4, which are specified by the ATVEF announcement. Two different non-ATVEF announcements are sent to predefined, fixed address/port A2. The first one indicates an address/port A5 for retrieving date and time information, while the second one indicates an address/port A6 for retrieving the binary data.

Applications of FIG. 2 act upon a socket layer 4 to listen to the required IP multicast addresses. The socket layer 4 operates over an operating system 5 including a VBI Driver (which is not illustrated). The Vertical Blanking Interval (VBI) driver retrieves data from the VBI of the incoming analog video signal. Of course, in case another transmission path were used (e.g. all digital television signal such as an MPEG II Transport Stream), another driver than the VBI Driver would be used. The retrieved data is under a packet format called IDLB. The driver extracts the payload from these packets and applies an error correction process. The payload is a SLIP-format stream which enables the driver to identify and separate IP packets. Once the SLIP layer has been removed and the IP packets have been reconstructed, the driver hands these packets over to the upper layers in charge of de-encapsulating the IP and UDP layers. The browser 1 and the other applications are clients of the socket layer 4 which enables them to listen to an IP address and a UDP port in order to retrieve the transmitted content.

The upper part of FIG. 2 will be described first. The upper and lower parts show the receiver's state at different moments in time.

The receiver runs a browser 1 in charge of retrieving respectively the ATVEF announcements, content and triggers and listens respectively to addresses A1, A3, A4, which the browser 1 has programmed at the socket level). In FIG. 2, it is supposed that at least one announcement has already been received. The browser may also listen to other addresses, which are not shown on FIG. 2. A first task 2 ('Binary data fetching manager') is in charge of retrieving the non-ATVEF announcements sent on address A2. A second task 3 ('Code download signaling data retriever') is used to retrieve the binary file itself on an address A6. The address A6 has previously been specified in a binary announcement on address A2. Two different tasks are used to retrieve the update announcement and the update file itself: this avoids having to sort the incoming data relating to these addresses.

The second task 3 need not be active all the time. It can be triggered by the first task 2, upon reception of an announcement relating to the kind of data retrieved by the second task 3.

According to the present embodiment, the 'i' field of an announcement is used to inform the task 2 of the nature of the data to be transmitted. For example, 'i' is equal to 'code download' for the transmission of binary data, and equal to 'date&time' for the transmission of the date and time information.

Contrary to ATVEF announcements, the announcement according to the present embodiment contains only one address and associated port value, to indicate to the receiver where to listen for the transmission of the binary data (code update, time, or other).

According to the present embodiment, such an announcement contains the following parameters relating to the address and port of the update file:

m=data 22814 tvpe-file c=IN IP4 235.37.32.27.

Other parameters are similar to those used in ATVEF announcements. This is given as an example: other values may be used as well.

As an example, a non-ATVEF announcement contains the following fields:

"v=0" see ATVEF
"i=XXX" see below
"a=UUID:XXX" see ATVEF
"a=tve-ends:XXX" or "t-start stop" see ATVEF
"m=data XXX tve-file" see above and ATVEF
"c=IN IP4 XXX" see above and ATVEF FIG. 2 also illustrates the dynamics of announcement handling in the receiver. The upper part of FIG. 2 shows the receiver's task at a time t. At this time, the browser 1 listens to its predetermined ATVEF announcement address A1, and to two further addresses for content (A3) and triggers (A4). The binary data fetching module 2 listens to the address corresponding to binary data announcements.

At a given time, a binary announcement concerning the transmission of date and time is received by the binary data fetching module 2. This announcement contains an IP multicast address A5 on which data and time information is due to be transmitted. As illustrated by the lower part of FIG. 2, a third task 6, named 'Date and time data retriever' is launched, in order to listen to the address A5 specified in the announcement.

Figure 3:
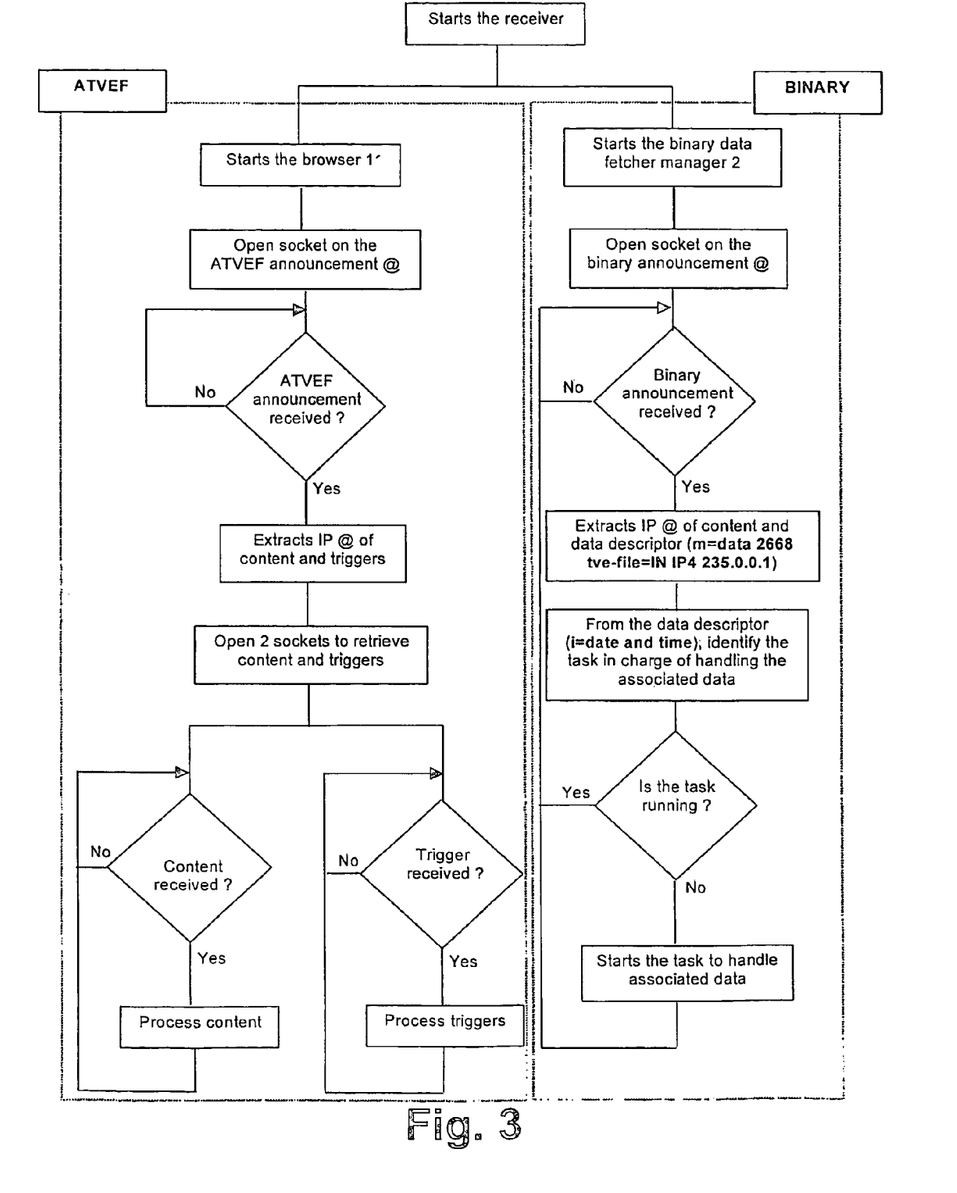
FIG. 3 is a flowchart of the processing of announcements and data by a receiver according to the invention.

FIG. 3 is a flowchart which further illustrates the processing of ATVEF and non-ATVEF announcements and data in the receiver.

It must be noted that from the point of view of the implementation, the test of whether an announcement is an ATVEF announcement or not corresponds in fact to the filtering carried out using the different IP multicast addresses.

The field "a=UUID" serves to identify the announcement. If the proprietary layer, in its role of binary data fetching module, already received an announcement with the same UUID value although the expiration date of this announcement has not yet been reached, the new announcement is ignored. It is up to the operator to modify the UUID value in order to inform receivers of an announcement content change. This mechanism avoids having to further process announcements if their UUIDs correspond to those of already existing announcements.

When preparing an announcement, the service provider or the broadcaster's emitter selects the address values for data transmission in a certain range. According to the present embodiment, one such range is reserved for ATVEF transmissions, while another such range is reserved for non-ATVEF transmissions (e.g. software module updates according to the present example). This avoids having ATVEF data sent to non-ATVEF addresses and vice-versa.

Through this mechanism, different kinds of services may easily be multiplexed.

Figure 4:
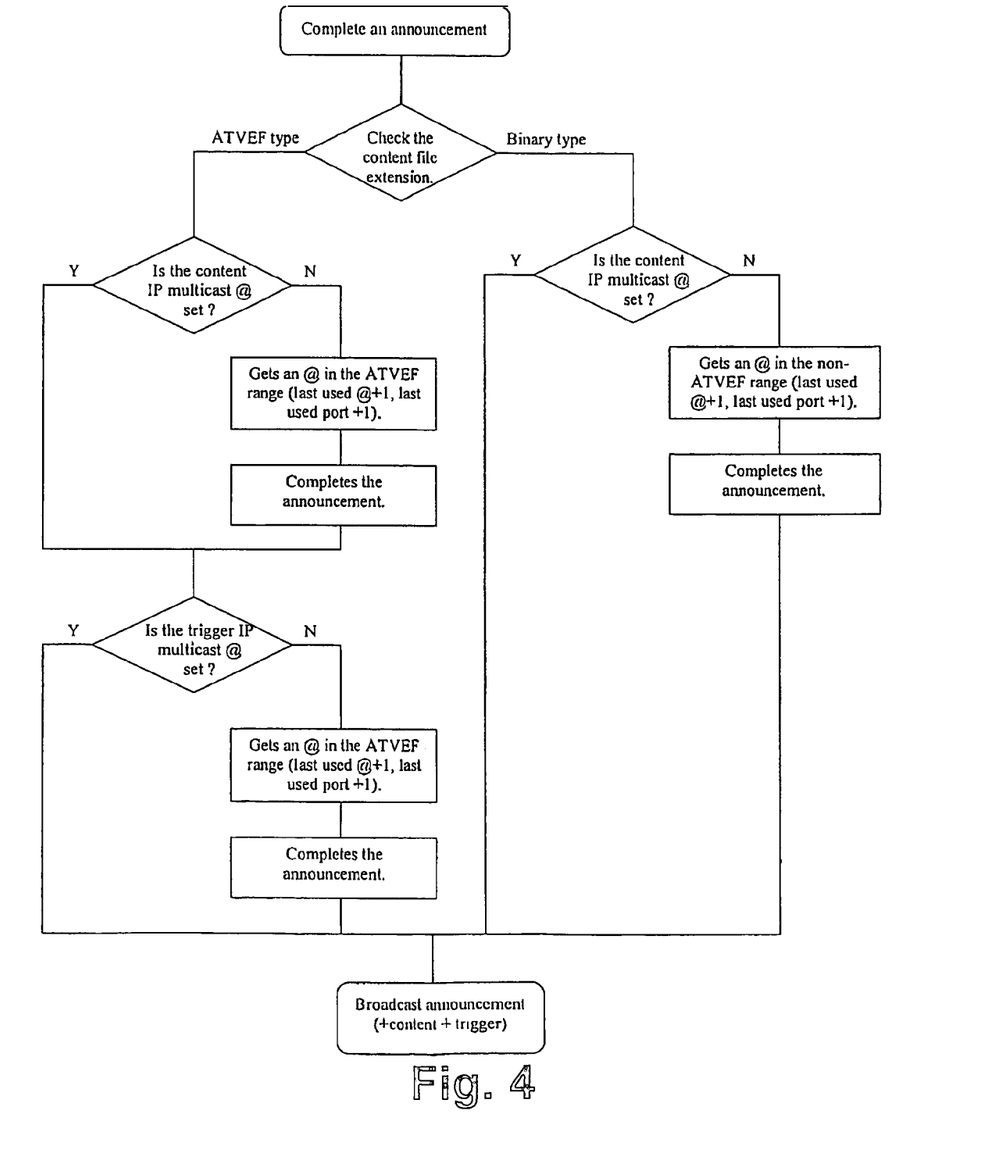
FIG. 4 is a flowchart of the processing of announcements in a broadcast server.

FIG. 4 is a flowchart of the announcement creation process in a server, showing how IP multicast addresses are automatically selected and inserted into announcements by the emitter in the absence of preset addresses.

In a preferred embodiment, the broadcaster receives the ATVEF or non-ATVEF announcements and dynamically adds through its emitter the content, trigger or binary data transmission addresses according to the predefined ranges.

As an example, the following address range is used for sending ATVEF enhancements on manually attributed addresses:

224.0.0.0 to 224.0.1.112 port numbers 0 to 2669.

The following address range is used for sending ATVEF enhancements on automatically attributed addresses:

224.0.1.114 to 234.255.255.255, port numbers 2671 to 65535.

The following address range is used for sending binary files on manually attributed addresses:

235.0.0.0 to 235.0.1.112, port numbers 0 to 2669.

The following address range is used for sending binary files on automatically attributed addresses:

235.0.1.114 to 239.255.255.255, port numbers 2671 to 65535.

Manually attributed addresses are addresses which are predetermined in announcements received by the emitter from e.g. the service provider, i.e. the emitter does not itself select such addresses, as opposed to announcements were such a choice is made automatically by the emitter, when at least one address is missing in an announcement. Different address ranges are used to avoid having the emitter pick an address which has already been defined manually in another announcement.

According to a variant embodiment, the address ranges used for ATVEF and non-ATVEF data transmissions are the same or at least overlap to a certain extent, but the port number ranges attributed to each kind of data transmission do not overlap. In other words, there will still be different IP multicast address ranges.

The two address ranges may be modified. In this case, an update mechanism is put in place at the receiver.

Figure 5:
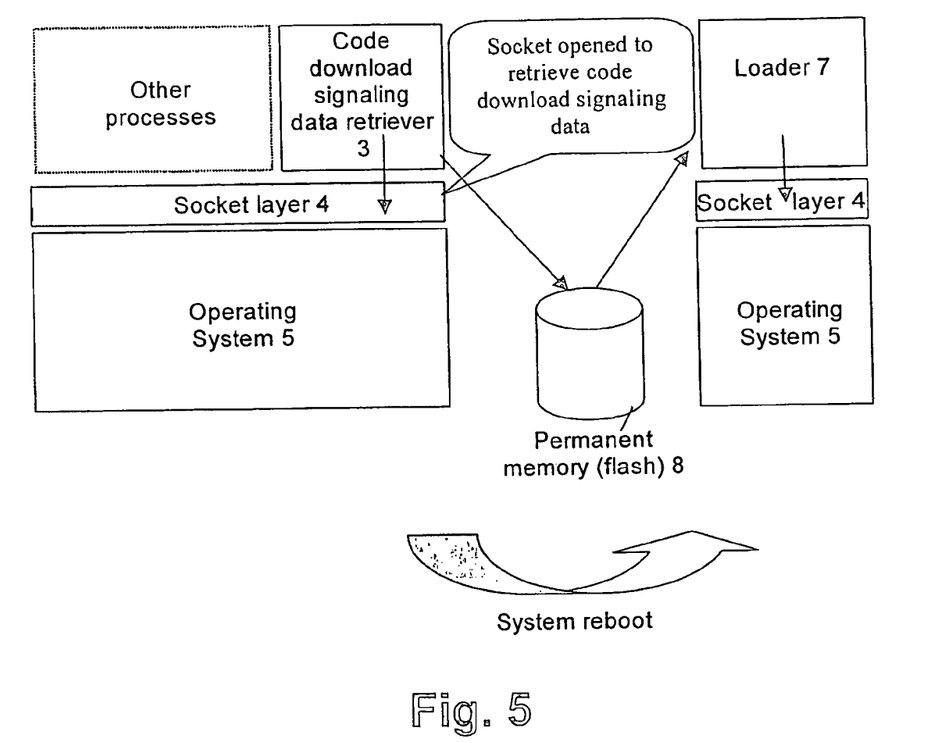
FIG. 5 is a schematic diagram illustrating the principle of acquiring an IP multicast address in a first step when the receiver is in nominal mode and using the stored IP multicast address in a second step during which the receiver is in a loader mode.

A variant embodiment, illustrated by FIG. 5, will now be described. This embodiment concerns the case in which the binary data to be downloaded may influence—and in particular interrupt—certain processes of the receiver.

One can consider a receiver in which downloading of executable code, for example all updatable code stored in a flash memory of the receiver, is to be performed. The receiver comprises a loader program 7 in order to perform the download. This program is stored in ROM, since all code stored in the flash memory is to be replaced.

The process in such a case is the following:

When the binary data fetching module receives a non-ATVEF announcement for an update, it starts a specific task (the code download signaling retriever of FIG. 2), which listens to an address specified in the update announcement. The code to be downloaded is not sent to this address, eventually with other signaling information describing the download to be carried out. Instead, this address receives a stream which describes the upcoming download, and in particular a download address. The code download signaling data retriever task stores this address in a predefined location in the flash memory 8 of the receiver, this location being protected from being erased during the subsequent download. When the download is to begin, the task reboots the decoder. The loader 7 is then launched. This program fetches the download address from the flash memory and downloads the code from this address. This update process may also be used in other environments than that of the present embodiment (i.e. environments not related to ATVEF).

Figure 6:
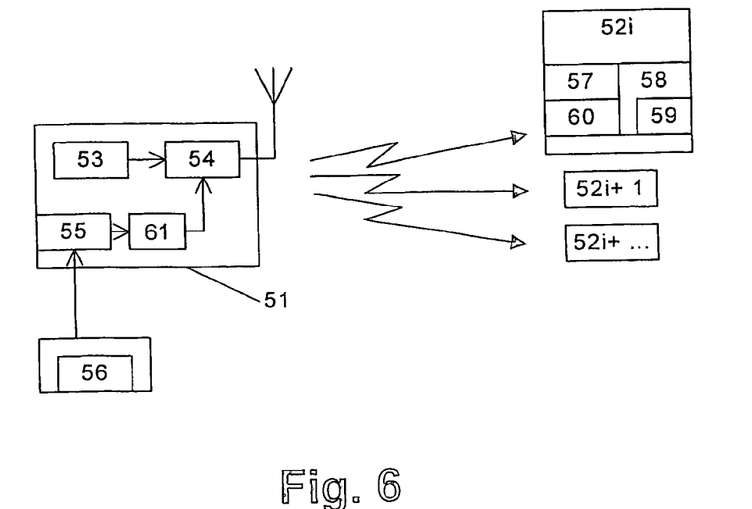
FIG. 6 is a schematic diagram of a network comprising an emitter and receivers according to the present embodiment.

FIG. 6 is a schematic diagram of a network comprising an emitter 51, and a plurality of receivers 52i. The emitter comprises a video signal source 53, a data inserter 54 controlled by a broadcast server 61. The broadcast server 61 is connected to a database 55, containing ATVEF and non-ATVEF data and announcements. The data inserter inserts data into the VBI lines of the video signal in an appropriate format, under control of the broadcast server, which defines timing and allocates signal resources. Data in database 55 may be provided by different sources, in particular a service provider 56. The broadcast server 61 automatically selects addresses as explained above, in case such an automatic selection is required. Receivers also comprise a microprocessor 57, a ROM 58 with a loader program 59 mentioned above, as well as a register or memory 60 adapted to hold a multicast address during receiver reset and/or reboot and/or power loss.

Although the present embodiment mainly concerns ATVEF-type protocols, the invention is not limited to that environment. In particular, other announcement formats than those of the ATVEF or SDP announcements may be used. The split multicast address ranges according to data type in particular constitutes an invention which may be employed in an other environment.

Lastly, although the embodiment above concerns an implementation using the vertical blanking interval of an analog video signal to transmit the enhancement and update data, the invention can easily be applied within other system, in particular all-digital transmission systems.

The emitter and receiver in the described system both comprises processing means such as a microprocessor (reference 57 in receivers of FIG. 5) and memory, for processing and respectively sending or receiving announcements, triggers, enhancement content and binary data.

The invention claimed is:

1. Method for transmitting receiver resident software module updates in a video transmission system comprising the steps of:
   providing an announcement of an interactive television service on a first predefined IP multicast address;
   providing a trigger for at least one of said interactive television service and a content transmission on a first range of IP multicast addresses;
   providing an announcement of a receiver resident software module update on a second predefined IP multicast address different from said first predefined IP multicast address, said announcement describing a download address of an upcoming download of said receiver resident software module update, said download address being chosen from among a second range of IP multicast addresses, exclusive of the first range;
   providing said download of said receiver resident software module update on said download address, said first and said second ranges of IP multicast addresses are split according to data type, said data type being one of said at least one of said interactive television service and a content transmission or said receiver resident software module update.

2. Method according to claim 1, wherein said video transmission system comprises an emitter comprising a data inserter for inserting said at least one of said interactive television service and content and receiver resident software module update information into a transmission signal, said method further comprising the steps of:
   providing announcements said at least one of said interactive television service and content and said receiver resident software module update announcements to the data inserter, and dynamic insertion of IP multicast addresses by the data inserter into the announcements, in accordance with the first and second ranges.

3. Method according to claim 2, further comprising the step of splitting the first and the second range of IP multicast addresses into a third and a fourth range, where the third range is reserved for automatic address determination by the data inserter, and the fourth range is reserved for addresses which are predefined in the announcements provided to the data inserter.

4. Method according to claim 1, wherein ranges are distinguished by different at least one of: different IP address ranges, and different port ranges.

5. The method of claim 1 where the first range of IP multicast addresses is allocated for said at least one interactive television service and a content transmission and said second set of IP multicast addresses are for said receiver resident software module update.

6. Emitter device for broadcasting announcements in a transmission system compatible with a transmission of an interactive television service, comprising:

a means for transmitting announcements of interactive television service on a first predefined IP multicast address, trigger of at least one of said interactive service and content data on a first range of IP multicast addresses, announcements of a receiver resident software module update on a second predefined IP multicast address different from the first predefined address, said announcements of a receiver resident software module update describing a download address of an upcoming download of said receiver resident software module update, said download address being chosen from among a second range of IP multicast addresses, exclusive of the first range and said receiver resident software module update on a second range of IP multicast addresses where said first and said second ranges of IP multicast addresses are split according to data type, said data type being one of said at least one of said interactive television service and a content transmission or said receiver resident software module update.

7. Device according to claim 6, further comprising a receiver for receiving an announcement, for determining whether the announcement comprises a predetermined IP multicast address in a first range, and in the negative, for selecting an IP multicast address in a second range, distinct from the first range, and for inserting the selected IP multicast address into the announcement.

8. The emitter device of claim 6 where the first range of IP multicast addresses is allocated for said at least one interactive television service and a content transmission and said second set of IP multicast addresses are for said receiver resident software module update.

9. Receiver in an interactive television service compatible transmission system, comprising:

a memory for storing a first predefined IP multicast address for receiving an announcement of an interactive television service, receiving a trigger for said interactive television service on a first range of IP multicast addresses, and for storing a second predefined IP multicast address for receiving receiver resident software module update announcements, said receiver resident software module update announcements describing a download address of an upcoming download of a receiver resident software module update, said download address being chosen from among a second range of IP multicast addresses, exclusive of the first range, where the first and second predefined IP multicast address are distinct, said first and said second ranges of IP multicast addresses are split according to data type, said data type being one of said interactive television service or said receiver resident software module update, the receiver further comprising a memory for storing said download address, said memory for storing said download address being such as to maintain said download address during a receiver reboot process;

means for listening to the said download address in the memory for storing said download address after said receiver reboot process for downloading the receiver resident software module update from said download address, and wherein the download address is comprised in signaling data announced on said second predefined IP multicast address.

10. Method for receiving data in a video transmission system comprising the steps of:

receiving announcements of interactive television services on a first predefined IP multicast address;

receiving trigger of interactive television services and/or content transmission on a first range of IP multicast addresses;

receiving announcements of a receiver resident software module update on a second predefined IP multicast address different from said first predefined IP multicast address, said announcement describing a download address of an upcoming download of said receiver resident software module update, said download address being chosen from among a second range of IP multicast addresses, exclusive of the first range;

receiving receiver resident software module update data transmission on said download address, where said first and said second ranges of IP multicast addresses are split according to data type, said data type being one of said at least one of said interactive television service and a content transmission or said receiver resident software module update.

11. Method according to claim 10, comprising, at the level of a receiver, the steps of:

receiving said announcement of receiver resident software module update announcing transmission of receiver resident software module update data, said announcement containing an IP multicast address on which signaling data describing the receiver resident software module update data transmission is to be sent;

listening to the address specified in the announcement;

retrieving the signaling data and storing it in a memory which is not erased during download of the receiver resident software module update data;

launching of a loader program;

having the loader program retrieve the stored signaling data; and proceeding with the download of the receiver resident software module update data based on the stored signaling data.

12. The method of claim 10 where the first range of IP multicast addresses is allocated for said at least one interactive television service and a content transmission and said second set of IP multicast addresses are for said receiver resident software module update.

* * * * *